April 14, 1942.   J. A. SPOONER   2,280,011
CHEESE COVER
Filed Jan. 9, 1939
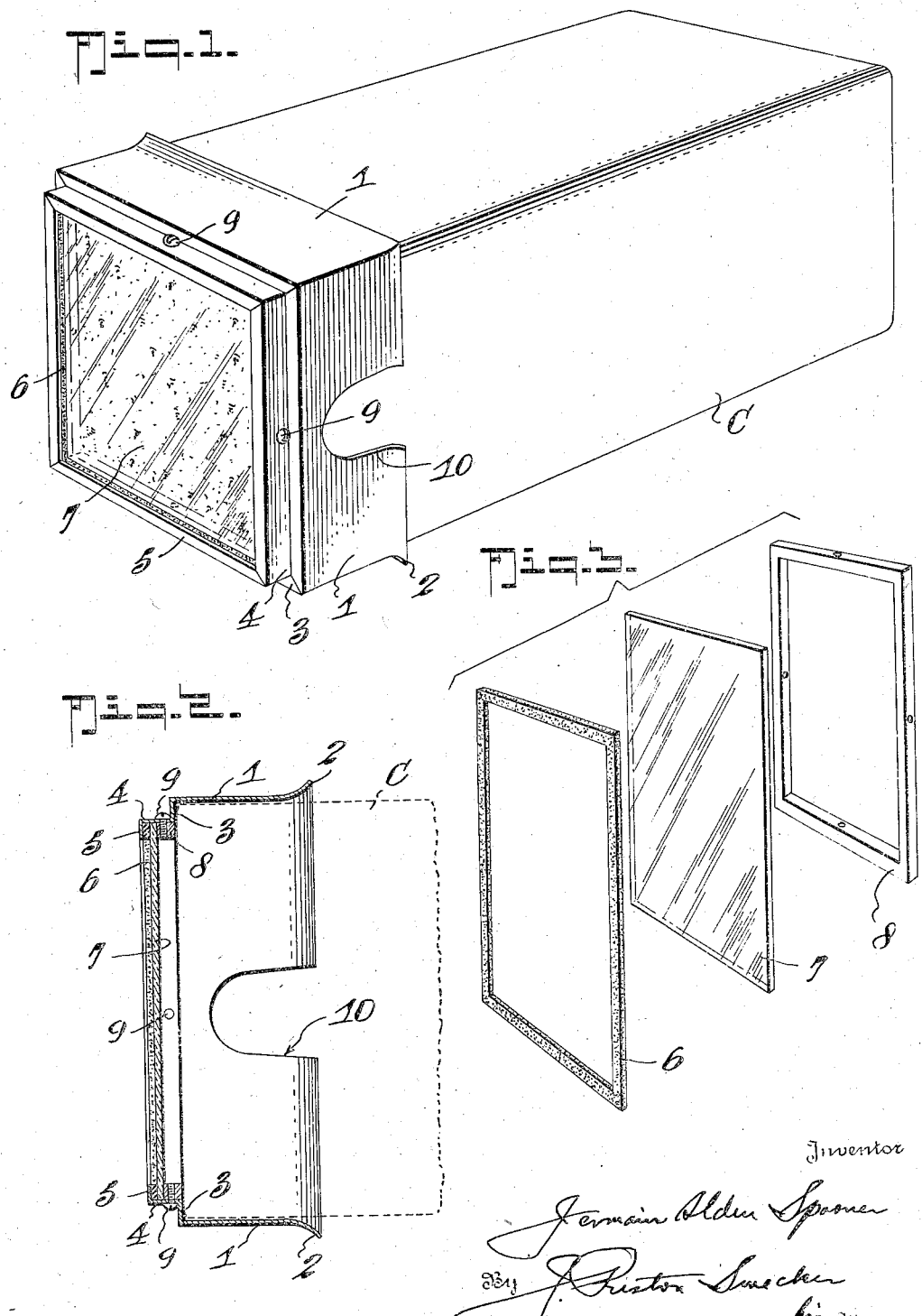

Patented Apr. 14, 1942

2,280,011

UNITED STATES PATENT OFFICE 2,280,011

CHEESE COVER

Jermain Alden Spooner, Parsons, Kans.

Application January 9, 1939, Serial No. 249,966

4 Claims. (Cl. 31—32)

This invention relates to an improvement in cheese covers of the type used for protecting and displaying loaf cheese where it is kept for sale.

It is customary at the present time for makers of cheese to form it into loaves that are square in cross-section, usually elongated, and of standard size. Such a cheese loaf is adapted for the slicing of the cheese therefrom, producing square slices which are particularly adaptable for the making of sandwiches. Each loaf is usually wrapped in Cellophane or tin foil. The retailer must fold back or remove the Cellophane or tin foil at one end of the loaf before slicing, while retaining this covering on the remaining portion of the cheese loaf for protection. Usually the cheese loaf is kept in a mechanical refrigerator or display case, where the exposed end of the cheese loaf becomes hard and dry during the intervals between sales therefrom. This deterioration makes it necessary for the retailer to cut off and discard the exposed end of the cheese before slicing from the remainder of the loaf. No practical manner has been provided heretofore that will effectively protect loaf cheese against exposure and deterioration.

The object of this invention is to provide a simple and effective cover that may be applied to an end of a cheese loaf, which will effectively protect the same against deterioration and at the same time add to the attractiveness of the cheese, keeping it on display to increase its sales appeal.

The invention is preferably embodied in a form that has the cover constructed to fit snugly over the end of the cheese loaf with provision therein for holding a transparent sheet or window embodied in the cover, spaced from the end of the cheese for viewing the latter therethrough without danger of contact or smearing that would result in an unsightly appearance. This cover is simple in construction and is capable of manufacture for sale at a comparatively low price, and yet it will effectively protect and display the exposed end of the cheese loaf.

The preferred embodiment of the invention is illustrated in the accompanying drawing, in which:

Fig. 1 is a perspective view of the cover applied to a cheese loaf;

Fig. 2 is a vertical sectional view through the cover; and

Fig. 3 is a disassembled perspective view of the glass and its retaining members for use in the cover body.

A loaf of cheese is designated generally at C in Fig. 1 and is usually made of uniform size, square in cross-section, with the cheese securely wrapped in a covering of Cellophane or tin foil that fits closely thereon and must be removed at one end before slicing the cheese for sale. My improved form of cover is constructed to fit over the exposed end of the cheese loaf to protect the same against deterioration and to expose the cheese for view in a display case.

This cover is constructed with a body portion shaped to fit the end of the cheese loaf, and is shown as having side walls 1 joined together at their adjacent ends and arranged in square box-like form to fit closely over the encased cheese loaf. The inner edges of the sides 1 are flared outward at 2 to facilitate the insertion of the loaf into the cover. At their outer edges, the sides 1 have inturned shoulders 3, preferably formed integrally therewith by bending the material of the sides inward, which shoulders 3 are adapted to be engaged by the end of the cheese loaf.

At the inner edges of the shoulders 3, the material is turned outward to form a frame 4 that has an inturned surrounding flange 5 on the front side thereof. A gasket 6 fits into the frame 4 against the flange 5 and receives thereagainst a sheet preferably of glass, designated 7, which extends over substantially the entire area of the cover so as to expose for view the end of the cheese loaf. The glass sheet is retained in place by a frame 8 that fits into the frame 4 substantially against the surrounding edges of the glass sheet 7 and is held in place by screws 9 threaded therein as shown in Fig. 2.

This provides a transparent cover which forms a window through which the exposed end of the cheese loaf may be viewed when on display in a case, and yet said exposed end is effectively retained and enclosed against drying out even in a refrigerated display case. The close fit of the sides 1 around the end of the cheese loaf as well as the engagement therebetween at the shoulder 3, effectively prevents the access of the air in the case to the exposed end of the cheese which keeps the same from drying out and from becoming hard or unsalable. At the same time, the shoulder 3 overlaps the end of the cheese loaf so as to prevent the same from coming into contact with the glass sheet 7, thereby protecting the latter from smearing and otherwise destroying its clear transparent condition. Then upon removal of the cover from the end of the cheese loaf, the cheese may be sliced therefrom without the necessity for first cutting off and discarding the exposed portion of the loaf, but on the contrary the cover effectively protects the cheese loaf and keeps it in fresh salable condition, as well as maintaining it on display in an attractive condition in the display case.

Two of the opposite side walls 1 are shown as provided with cut-outs 10 to facilitate grasping of the block of cheese when the loaf has been reduced to a relatively small size lengthwise that would otherwise lie entirely within the confines of the side walls 1. These cut-outs 10 are not sufficiently large to expose the uncovered end of the cheese but are just sufficient to permit grasping and removal of a small block thereof from within the cover.

I claim:

1. A cheese cover adapted to be applied to an end of a substantially square cheese loaf, comprising an enclosing casing having surrounding side walls adapted to embrace and closely fit an end of the cheese loaf, and a transparent window within the confines of the walls and closing said casing at the front thereof, means within the casing forming a shoulder therein at a plurality of edges of the window limiting the movement of the cheese loaf toward the window and holding the same spaced therefrom, said window being substantially normal to the axis of the casing, the opposite end of the casing being open and unobstructed between the side walls for slidably receiving the cheese loaf therein.

2. A cheese cover adapted to be applied to a loaf of cheese, comprising an enclosing frame formed by side walls adapted to embrace and receive therein the cheese loaf, said side walls having a surrounding internal shoulder at the forward edges thereof and having an outwardly extending frame on said shoulder, a sheet of transparent material mounted within the frame, resilient means interposed between the forward side of the sheet and the frame, and retaining means mounted in the frame at the inner side of the sheet and holding the same therein and in spaced relation from the shoulder, for engagement of the shoulder with the cheese loaf to prevent contact of said loaf with the transparent sheet.

3. A cheese cover adapted to be applied to a loaf of cheese comprising a body portion formed by side walls adapted to embrace and received therein the cheese loaf, said side walls being formed of sheet material with the forward ends thereof bent inwardly to provide an internal shoulder in position to bear against an end of the loaf of cheese and then bent forwardly from the inner edge of said shoulder to form a frame, a sheet of transparent material enclosed within the frame, and means for mounting said sheet in the frame spaced forwardly from the shoulder out of contact with the cheese loaf when said loaf is bearing against the shoulder.

4. A cheese cover adapted to be applied to a loaf of cheese comprising a body portion formed by side walls adapted to embrace and receive therein the cheese loaf, said side walls being formed of sheet material with the forward ends thereof bent inwardly to provide an internal shoulder approximately at right angles to the axis of the frame in position to bear against an end of the loaf of cheese, said sheet material being bent forwardly from the inner edge of said shoulder to form a frame rigid therewith, a sheet of transparent material enclosed within the frame, and means for mounting said sheet in the frame spaced forwardly from the shoulder out of contact with the cheese loaf when said loaf is bearing against the shoulder, the side walls having cut-outs in the inner ends thereof in position for grasping the sides of the cheese loaf therethrough.

JERMAIN ALDEN SPOONER.